Patented June 12, 1923.

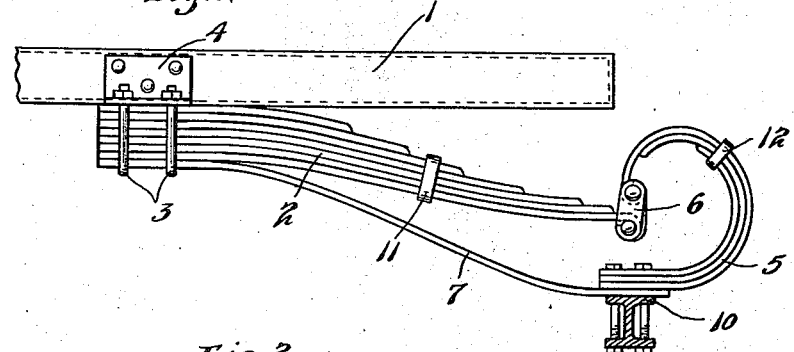
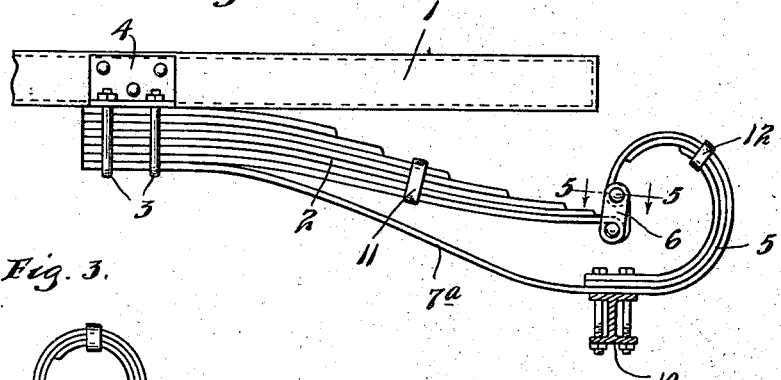
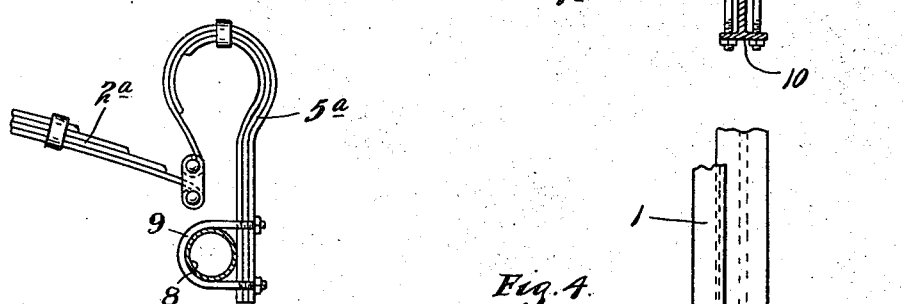
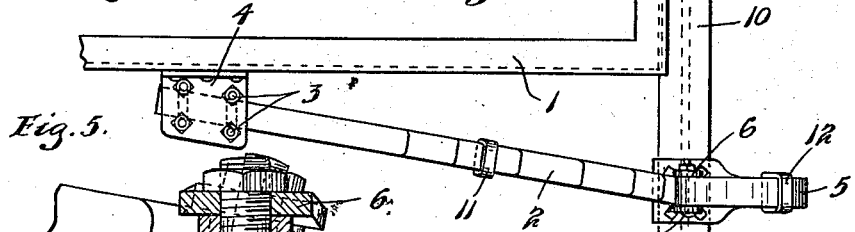
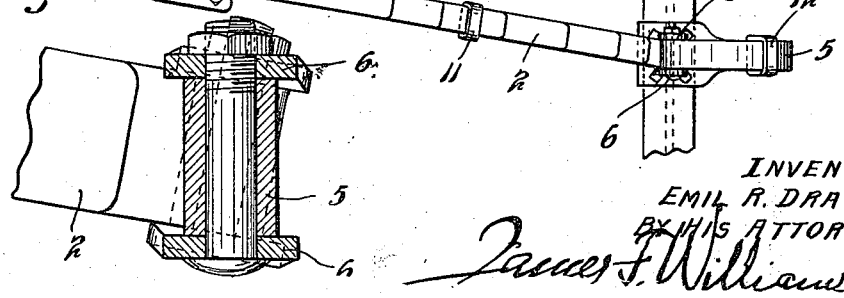

1,458,912

UNITED STATES PATENT OFFICE.

EMIL R. DRAVER, OF RICHMOND, INDIANA.

SHOCK ABSORBER.

Application filed October 28, 1921. Serial No. 511,009.

*To all whom it may concern:*

Be it known that I, EMIL R. DRAVER, a citizen of the United States, residing at Richmond, in the county of Wayne and State of Indiana, have invented certain new and useful Improvements in Shock Absorbers; and I do hereby declare the following to be a full, clear, and exact description of the invention, such as will enable others skilled in the art to which it appertains to make and use the same.

This invention relates to a shock-absorbing device for a vehicle, particularly an automobile.

It is an object of this invention to provide a shock absorber for an automobile having the body supported on the axle by cantilever springs which extend at right angles to the said axle or at a slight angle to the longitudinal center line of the frame and body, and such shock absorber comprises a leaf spring secured to the axle in an upright position and formed as a nearly closed curve, the free end of said spring being pivotally connected to the free end of the cantilever spring.

It is a further object of the invention to provide, with said parts, a torque or radius rod preferably of resilient material.

These and other objects of the invention will be clearly apparent from the following description made in connection with the accompanying drawings in which like reference characters refer to the same parts throughout the different views, and in which, Fig. 1 is a view in side elevation of the shock absorber;

Fig. 2 is a view in side elevation of a slightly modified form of the same;

Fig. 3 is a view in side elevation of still another modification;

Fig. 4 is a plan view of the device; and

Fig. 5 is a sectional plan taken on the line 5—5 of Fig. 2, as indicated by the arrows.

Referring to the drawings, the side member of the vehicle or automobile frame or body is designated as 1. The member 1 is secured to the end of a cantilever spring 2. This spring may, of course, be secured in any well known manner, but in the embodiment of the invention illustrated, is shown as clamped by U clips 3 to a bracket 4 bolted to the side of the frame 1. The cantilever spring 2 extends toward the axle 4 of the automobile, and, as shown in Fig. 4, may extend at a slight angle to the normal of said axle. The specific angle which the cantilever spring makes with the axle will, of course vary in different makes of cars, but such angle rarely departs more than fifteen degrees from a right angle, that is, the line of the cantilever spring rarely makes an angle of more than fifteen degrees with the longitudinal center line of the chassis members.

Secured to the axle in an upright position is a leaf spring 5. This spring is curved so as to form a nearly closed figure of approximately semi-circular or semi-elliptical form. This spring, preferably, is disposed in a plane approximately at right angles to the axle and the free end thereof is pivotally connected to the free end of the cantilever spring 2 by a pair of the customary shackles 6. As the spring 5 makes a slight angle with the spring 2, these shackles are shown as having a slight twist therein (see Fig. 5), so that the pivotal connection between the springs can be conveniently made. It is, of course, within the scope of the invention to mount the springs in line so that no twist in the springs or shackles would be necessary for the connection. It is also obvious that instead of placing the twist in the shackles, the end of the spring 5 might be given a slight twist and straight shackles used.

The springs 2 and 5 are shown as equipped with the usual clips 11 and 12, respectively, for holding the leaves of the springs in proper relation.

A radius rod or torque rod 7 is provided and, as shown in Fig. 1, this rod comprises a flat spring bar rigidly secured to the frame with the end of spring 2 and suitably curved so that its other end is rigidly secured to the axle 4 with the end of the spring 5.

In the modification shown in Fig. 2, one of the leaves of spring 5, preferably the lower, is continued to form the radius rod 7ª, the same being otherwise like the structure shown in Fig. 1.

It will, of course, be understood that the springs 5 can be secured in different relations to the axle 4, and in Fig. 3, such a spring 5ª is shown as secured to a round axle 8, such as the rear axle of an automobile, and clamped by U clips 9 to the side of said axle, the cantilever spring being shown as 2ª.

While the device has been shown as applied to one end of the vehicle which might be taken as the front end, it will be apparent that the invention is equally applicable to the rear axle of the vehicle.

In operation, when relative movement occurs between the frame 1 and the axle 4, the same will be resisted by the flexing of the springs 2 and 5. As is well known, the heavy leaf springs used on automobiles are comparatively stiff and do not readily absorb the light shocks. By providing the shock absorbing spring 5, a much greater flexibility of spring is obtained and the body of the car is not subjected to such frequent jolts as when only the heavy cantilever spring is used. Also in severe shocks which greatly flex the cantilever spring, the spring 5 acts to absorb the rebound of the spring and thus eliminate much of the jolting effect on the body of the vehicle. The provision of the radius rods will at all times hold the axle in its proper position.

While one embodiment of the invention has been illustrated, it will, of course, be understood that various changes may be made in the form, details and arrangement of the parts without departing from the scope of applicant's invention, which, generally stated, consists in the matter shown and described and set forth in the appended claims.

What is claimed is:

1. The combination with the body, frame and axle structure of a vehicle, of a cantilever spring anchored to said frame with its free end extended toward the axle and making an angle approximating a right angle therewith, and a curved leaf spring rigidly secured to said axle extending upwardly therefrom and having its free end connected to the free end of said cantilever spring, said latter spring lying in a plane extending at approximately a right angle to the axle.

2. The combination with the body, frame and axle structure of a vehicle, of a cantilever spring rigidly secured to said frame with its free end extending toward said axle and making a slight angle with the longitudinal center line of said body and frame, a leaf spring forming a nearly closed curve secured in upright position to said axle and in a plane substantially at right angles thereto and having its free end pivotally secured to the free end of said spring.

3. The combination with the body, frame and axle structure of a vehicle, of a cantilever spring secured to said frame with its free end extending outwardly toward the axle, and making a slight angle with the center line of said body and frame, a leaf spring curved in a nearly closed figure secured to said axle in upright position and in a plane substantially at right angles thereto, and a twisted shackle connecting the free end of said spring with the free end of the cantilever spring.

4. The structure set forth in claim 1, and a radius rod comprising a spring bar secured to the frame of the vehicle and to said axle.

5. The structure set forth in claim 1, and a radius rod comprising a curved spring bar formed by an extension of one of the leaves of the said curved leaf spring and secured to the frame of the machine.

6. The combination with the body, frame and axle structure of a vehicle, of a cantilever spring anchored to said frame with its free end extending toward said axle and making a slight angle with the longitudinal center line of the said body and frame, and a resilient member rigidly secured to the axle extending above the same and the end of said cantilever spring and being swingingly connected at its free end to the free end of said cantilever spring.

In testimony whereof I affix my signature.

EMIL R. DRAVER.